Figure 3:
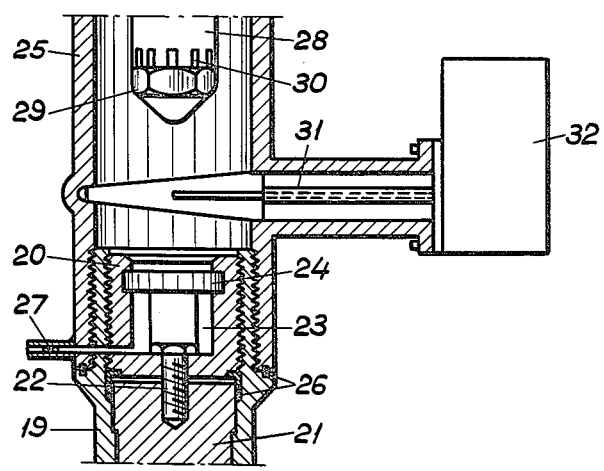

Jan. 8, 1963    K. D. MADSEN    3,072,554
RADIATION PROTECTION MEANS DURING THE
EXCHANGE OF FUEL ELEMENTS
Filed Feb. 29, 1960    2 Sheets-Sheet 1
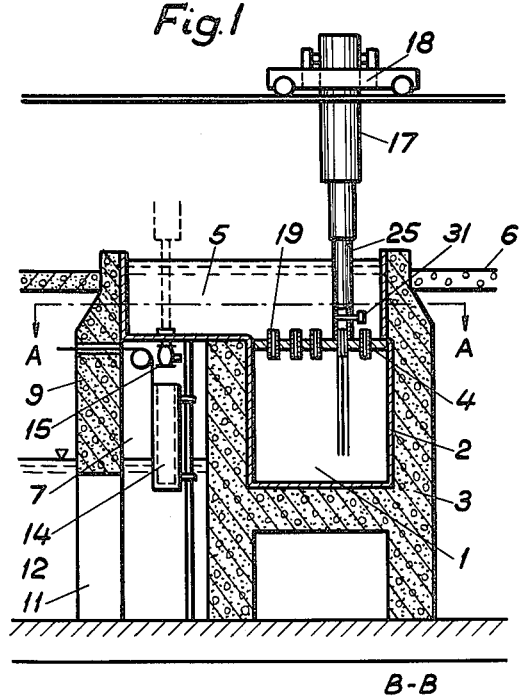
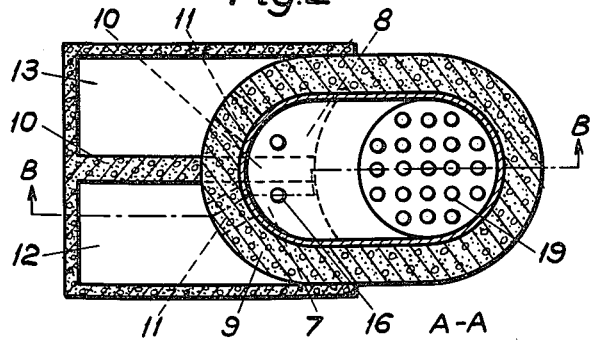
INVENTOR.
KRISTIAN D. MADSEN
BY
Bailey, Stephens & Huettig
ATTORNEYS

United States Patent Office 3,072,554
Patented Jan. 8, 1963

3,072,554
RADIATION PROTECTION MEANS DURING THE EXCHANGE OF FUEL ELEMENTS
Kristian D. Madsen, Vasteras, Sweden, assignor to Allmanna Svenska Elektriska Aktiebolaget, Vasteras, Sweden, a corporation of Sweden
Filed Feb. 29, 1960, Ser. No. 11,867
3 Claims. (Cl. 204—193.2)

The present invention relates to protection means for a gas cooled nuclear reactor or more generally speaking, for a reactor in which the coolant is a fluid other than water. Usually the reactor is surrounded by thick concrete walls which bring about biological protection against radiation. Above the reactor cover there is placed a thick plate which likewise serves as a radiation shield. This plate has to be removable or provided with exchangeable plugs for the exchange of the fuel elements, which operation is usually performed by a loading machine. Since the fuel elements contained in the loading machine also radiate, the loading machine itself has to be provided with a reliable radiation shield which increases the cost of the apparatus and makes it difficult to operate.

In a reactor which is cooled by water, the exchange of the fuel elements does not involve any difficulty as a water tank for the exchange of the fuel elements may be arranged above the reactor cover and as the water tank serves on the top as a radiation protection, instead of the said thick plate. When the reactor cover is removed, this tank is, so to say, a prolongation of the reactor tank upwardly. The old elements can be drawn out of the reactor tank for transportation to another place.

In a gas cooled reactor, however, in which the water from said tank may not come into contact with the fuel elements either in the reactor or during their transportation, the said tank cannot be used without further means, but if an arrangement is used according to the invention it remains possible to employ light water as radiation protection on the cover of the reactor. The feature of the invention is a protection means by which the radiation from the reactor as well as from the fuel elements when they travel from the reactor to a pond, is rendered innocuous due to the fact that above the reactor is located a water tank which covers a second water tank in which the fuel elements are stored at least intermittently and in that the loading machine employed for the exchange of the fuel elements is constructed as a longitudinally extending vessel which may be connected in a pressure tight manner with leading-through bushings for the fuel elements in the reactor cover, and that said bushings are provided with internal sealing plugs for the fuel elements removable by the loading machine.

When the loading machine is coupled to the bushings, the gas pressure in the machine is increased to the value which occurs in the cooling system of the fuel elements. Thereafter the sealing plug is removed by means of a device in the loading machine. The pressure vessel of the loading machine thus is a prolongation of the pressure tank of the reactor. The fuel elements, therefore, may be lifted into the loading machine without coming in contact with the water. A new fuel element which is already present in the magazine of the loading machine, is inserted in the reactor and a sealing plug is screwed in the bushing. A valve on the lower end of the loading machine is closed so that no water can enter the loading machine when it is removed from the bushing. The loading machine is now conveyed laterally to a similar bushing in the tank, the water level of which is suitably so high that the spent fuel elements are conveyed submerged in the water which works as radiation shield.

On the accompanying drawing an embodiment of the device according to the present invention is shown by way of example and diagrammatically.

Figure 4:
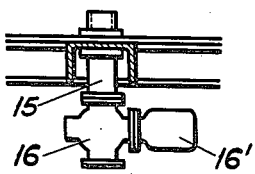

FIGURE 1 is a vertical section along the line B—B in FIGURE 2, through equipment consisting of a reactor and means for conveying and storing fuel elements; FIGURE 2 is a horizontal section through the same equipment, taken along the line A—A in FIGURE 1; FIGURE 3 shows a detail 17 of the loading machine, and a pipe socket on the reactor; and FIGURE 4 shows a further detail.

The bottom and side walls of the reactor 1 are surrounded by a metallic casing 2 and concrete walls 3 which serve as thermal and biological shields respectively. Above the cover 4 of the reactor, a tank 5 is arranged which is lowered suitably in the floor 6 of the reactor room. The tank is not only extended over the cover of the reactor, but it is prolonged at one side so as to cover further the two chambers 7 and 8. Chamber 7 is filled with water to a certain height.

The chambers are confined by the concrete walls 3, a concrete wall 9 and a partition 10. One of the gates 11 joins the chamber 7 with a further chamber 12 referred to as the pond and the other gate 11 joins the chamber 8 with a chamber 13. (It may be assumed that the chambers 7 and 12 are used for conveying spent fuel elements from the reactor and the chambers 8 and 13 for conveying new fuel elements to the reactor.) The chambers 7 and 12 therefore are filled with water to such a height that the surface of the water lies above the upper edge of the gate 11. A means for lowering spent fuel elements into the chamber 7 is indicated schemaically by an upwardly open container 14 which may be hoisted below a pipe socket 15 which goes through the bottom of the tank 5 and has a valve 16 with an operating device 16' (see FIGURE 4). When a fuel element has been inserted in the container 14, and the latter is lowered to the bottom, it is displaced by means of a pliers device through the gate 11 into the chamber or pond 12 where the element may be removed by a similar device below the surface of the water. The loading machine 17 for the fuel elements, is supported by a traversing hoist 18 above the reactor. An embodiment of the lower part of the loading machine which forms a pressure vessel and the associated pipe socket 19 in the cover 4 of the reactor are shown in FIGURE 3. For every fuel element or group of fuel elements there is such a pipe socket or bushing. This bushing is provided on its upper part with internal and external threads, and receives an outwardly threaded sealing plug 20, and below this, the head 21 of the fuel element. The plug 20 is joined with the head 21 by a screw bolt 22 and has a hexagonal recess 23 and a circular slot 24.

The lower end of the loading machine is formed by a pipe with internal threads so that it can be screwed on the pipe socket 19, both parts being sealed by a packing ring 26. Also, between the fuel element head 21 and the inner wall of the pipe socket 19, there is a packing. 27 is a draining duct having a valve for exhausting water occasionally retained in the pipe socket 19.

The loading machine has in its interior a key 28 movable vertically which is provided with a hexagonal head 29 and movable pawls 30. When the loading machine is screwed on the pipe socket 19 and subjected to full gas pressure, and when the key 28 has been lowered to the cavity 23 of the sealing plug, the pawls are turned outwards and grip in the slot 24. By rotating the key, the sealing plug is unscrewed and the fuel element attached to the head 21 may be hoisted into the loading machine. The gaseous cooling medium present between the fuel rods in the reactor also fills the pressure bottle-shaped part of the loading machine. A new fuel element which is present in the magazine of the loading machine is put in and screwed up. The end of the loading machine is now closed by means of the slide valve 31 which is operated by a device 32 in the loading machine. The latter is displaced to the position indicated by dotted lines in FIGURE 1, and is screwed on the pipe socket 15 (FIGURE 3), the lower end of which is provided with a water valve 16 which is opened only when the loading machine is screwed up. The fuel element is inserted in the container 14 and can be conveyed below the surface of the water to the chamber or pond 12 wherein the radioactivity of the element has time to disappear. The insertion of a new fuel element is accomplished in a similar manner. The chambers 8 and 13, however, must not contain water.

I claim:

1. In a nuclear gas cooled reactor having a pond, means for protecting against radiation from spent fuel elements during transportation from the reactor to the pond, and for feeding the reactor with new fuel elements, comprising first and second chambers located on one side of the reactor separated therefrom and from each other, the first of said chambers being adapted to receive spent fuel elements and being partly filled with water and communicating with said pond through a gate below the water level of said chamber, the second chamber communicating through a gate with a supply chamber for new fuel elements, a water filled tank located directly above the reactor and extending over the said first mentioned chambers, pipe sockets in the bottom of said tank fixed to the ends of the canning means of the fuel elements and adapted to be coupled with the lower part of a displaceable loading machine for the fuel elements, said part being shaped as a longitudinally extending pressure vessel for receiving fuel elements, corresponding pipe sockets mounted in the bottom of the said tank above the said first mentioned chambers, and adapted to be coupled with the lower part of the loading machine, and means for lowering spent fuel elements into said first chamber.

2. In a nuclear gas cooled reactor having a pond, means for protecting against radiation from spent fuel elements during transportation from a nuclear reactor to the pond, comprising a water filled tank located above the reactor and above first and second chambers on one side of the reactor, the first of said chambers communicating with said pond and the second of said chambers communicating with a supply chamber for new fuel elements, pipe sockets in said tank in register with the ends of the canning means of the fuel elements in the reactor, sealing plugs in said pipe sockets, a displaceable loading machine provided at its lower end with a longitudinally extending pressure vessel for receiving spent and new fuel elements, adapted to be screwed on said pipe sockets, means for removing the said plugs from and inserting them in said pipe sockets, valve means in the vessel of the loading machine for preventing the entrance of water into the loading machine, at least one similar pipe socket in the bottom of the said water filled tank above each of the two first named chambers, water valve means mounted on said latter pipe socket, and a vertically movable container within the chamber communicating with said pond.

3. A reactor according to claim 2, wherein the lower end of the bottle-shaped part of the loading machine is a tube with internal threads and the upper ends of the pipe sockets have external threads for fixing the loading machine to a pipe socket, and internal threads for securing a sealing plug to be inserted in and removed from the pipe socket by a gripping means in the loading machine.

References Cited in the file of this patent

FOREIGN PATENTS

| 789,022 | Great Britain | Jan. 15, 1958 |
| 217,293 | Australia | Sept. 15, 1958 |

OTHER REFERENCES

APAE 10 (vol. II), "Phase III Design Analysis for the Army Package Power Reactor," August 1956, pages 32 and 33, Alco Products, Inc.

Vaughn et al.: "Proceedings of the Second United Nations International Conference on the Peaceful Uses of Atomic Energy," vol. 8, September 1958, pages 458–459, United Nations.